United States Patent [19]

Thompson et al.

[11] 4,303,038

[45] Dec. 1, 1981

[54] TEAT CUP WITH AIR INLET

[75] Inventors: Duncan M. Thompson, Warrenville; Harold V. Swanson, Downers Grove, both of Ill.; Lawrence J. Coombs, Bath, England

[73] Assignee: Babson Bros. Co., Oak Brook, Ill.

[21] Appl. No.: 123,123

[22] Filed: Feb. 21, 1980

[51] Int. Cl.³ .................................................. A01J 5/04
[52] U.S. Cl. .............................. 119/14.36; 119/14.49
[58] Field of Search ..................... 119/14.36–14.44, 119/14.47–14.55, 14.01, 14.02, 14.08

[56] References Cited

U.S. PATENT DOCUMENTS

| 951,403 | 3/1910 | Lane | 119/14.36 |
|---|---|---|---|
| 3,255,732 | 6/1966 | Raht | 119/14.36 |
| 3,476,085 | 11/1969 | Noorlander | 119/14.36 |
| 3,611,993 | 10/1971 | Norton | 119/14.36 |
| 4,173,946 | 11/1979 | Maier et al. | 119/14.36 |

FOREIGN PATENT DOCUMENTS 114057  10/1941  Australia .......................... 119/14.47

Primary Examiner—Jay N. Eskovitz
Attorney, Agent, or Firm—Wegner, Stellman, McCord, Wiles & Wood

[57] ABSTRACT

A teat cup has an inflation with an intermediate portion sealed against the shell, defining a space adjacent the bottom of the shell, separate from the pulsation space. Holes through the shell and the inflation wall below the intermediate seal admit air to the inflation aiding the flow of milk. An air filter keeps dirt from the milk.

15 Claims, 3 Drawing Figures

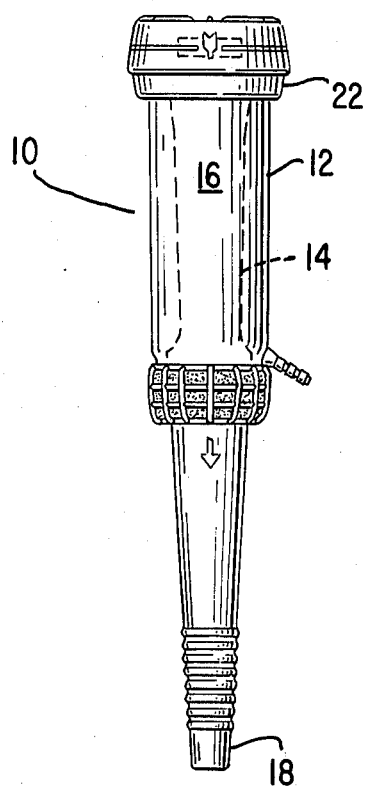
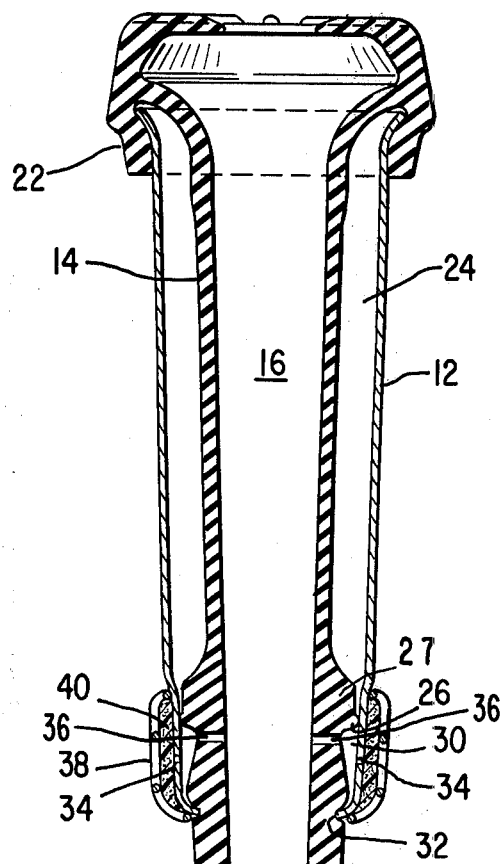
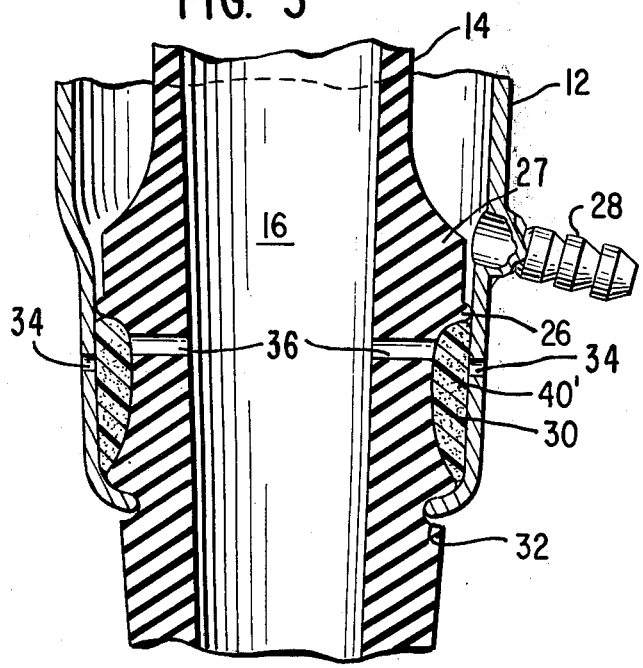

TEAT CUP WITH AIR INLET

BACKGROUND OF THE INVENTION

This invention relates to admitting air into a flexible inflation of a teat cup assembly of a milking machine.

The teat cup of a double action milking machine has a rigid shell with a resilient liner which receives the teat. A constant vacuum is applied at the end of the teat through the stem of the teat cup, permitting milk to flow to a milk receiver. A pulsating vacuum is applied to the inflation chamber between the liner and the shell 40 to 60 times per minute, causing expansion and contraction of the resilient liner. When the resilient liner is expanded around the teat (i.e. the chamber between the cup and the shell is evacuated), milk flows from the teat. The milk must be removed from the liner through its stem and into the attached milk hose at a speed sufficient to prevent interference with expansion and contraction of the liner.

Noorlander U.S. Pat. No. 3,476,085 provides an air inlet plug in the wall of the stem of the teat cup near its upper end. The plug has an opening therethrough for admitting a metered amount of atmospheric air into the upper end of the stem. The Noorlander air inlet is subject to blockage, as by dried milk, flies, straw or the like.

SUMMARY OF THE INVENTION

Air inlets are located in the shell and resilient liner of a teat cup having an inflation, these inlets allowing atmospheric air into the liner through an annular chamber separate from but adjacent to the lower end of the inflation. The atmospheric air which is let in aids in the rapid removal of milk from the teat cup to the attached milk bowl.

A feature of this invention is to provide air inlets which are in a rigid shell so that the maximum rate of air admitted into the liner will remain constant during operation. Also, air filtering material is used to prevent dirt from getting into the milk flow through the inlets.

BRIEF DESCRIPTION OF THE DRAWINGS

FIG. 1 is a side view of the improved teat cup assembly;

FIG. 2 is a longitudinal section through the center of the improved teat cup assembly; and FIG. 3 is a fragmentary longitudinal section of a teat cup with an alternate air filter.

DESCRIPTION OF PREFERRED EMBODIMENT

The teat cup is shown generally in FIG. 1. The teat cup 10 consists of a rigid tubular shell 12 surrounding a single piece resilient inflation or liner 14. This inflation is normally made of elastomeric material. A cow's teat is received in bore 16 within the liner 14. The stem 18 of the teat cup 10 is connected with an evacuated milk receiver, not shown.

As shown in FIG. 2, the resilient liner 14 extends beyond the upper rim of the shell 12 so that only the resilient material of the liner 14 comes into contact with the cow's teat. A collar 22 extends around the resilient liner 14 and forms an annular airtight seal with the upper end of the shell 12. In a conventional teat cup with an inflation, there would also be a single airtight seal between the inflation and the bottom of the shell, thereby creating a singular annular airtight chamber. With the teat cup assembly of this invention, there are two annular chambers 24 and 30. The upper inflation chamber 24 corresponds in function to the chamber in a conventional teat cup inflation. Upper inflation chamber 24 is created by providing an airtight seal where the shell 12 firmly abuts against a rib 26 around the liner 14. This seal is maintained by providing a thickened section 27 in the liner 14 which does not deform when subjected to pressure on the outside and vacuum on the inside. The rib 26 must be sufficiently resilient to form an annular seal with the shell 12, it being recognized that the shell 12 will not be perfectly cylindrical.

As with conventional teat cup inflations, a nipple 28 on the shell 12 is connected to a source of alternating vacuum and air which expands and collapses the upper inflation chamber 24. This causes alternate squeezing and releasing of the cow teat in the bore 16, thereby aiding in milking.

The second or lower annular chamber 30 is formed between the seal at the rib 26 and a seal formed by the abutment of the lower end of the shell 12 into a channel groove 32 within the thickened wall of the liner 14. Air inlets 34 are located in that portion of the shell 12 which encircles the lower chamber 30. Larger air inlets 36 are located in the liner wall 14 around the interior of the lower chamber 30. Although there may be several inlets in each surface, it is only necessary that there be one inlet 34 in the shell 12 and one larger inlet 36 in the liner 14. In addition, the inlets 34 in the rigid shell 12 and the inlets 36 in the liner 14 need not be aligned with one another. Atmospheric air is admitted to the bore 16 of the teat cup immediately beneath that portion of the inflation 14 above thickened section 27 which flexes during operation.

The amount of atmospheric air which enters the bore 16 is controlled by the size of the inlets 34 in the rigid shell 12. The inlets 36 in the liner 14 are made large enough so as not to interfere with entering air even when the inlets 36 are decreased in size if the liner 14 should be twisted. The inlets 34 in the rigid shell 12 may be accurately sized by drilling through the rigid shell 12; and since those inlets 34 control the rate of flow of air to the bore 16 of the liner 14, the problem of precisely forming inlets in the resilient material of the liner 14 is avoided.

A cage 38 is secured around that portion of the shell 12 which encircles the lower annular chamber 30. This cage 38 holds filtering material 40 around the inlets 34 so as to prevent dirt from entering the inlets. This filtering material 40 also protects the inlets 34 from becoming clogged.

FIG. 3 shows an alternative construction in which the filtering material 40' is placed within the lower annular chamber 30. This construction would similarly prevent dirt from getting into the bore 16.

I claim:

1. A teat cup assembly of a milking machine, comprising:
   a liner made of resilient material;
   a rigid shell sealed with said liner so as to form separate upper and lower chambers between the liner and the shell;
   means in the shell around the upper chamber to connect a source which alternately inflates and deflates said upper chamber;
   at least one inlet in the shell around the lower chamber; and
   at least one inlet in the liner wall of the lower chamber.

2. The teat cup assembly of claim 1 wherein the inlet in the inflation wall is a size larger than the inlet in the shell so that airflow into the interior of the liner through the lower chamber is controlled by the size of the inlet in the shell.

3. The teat cup assembly of claim 1, further comprising:
air filtering material;
means for securing said filtering material around said rigid inlets.

4. The teat cup assembly of claim 3, wherein said means for securing said filtering material comprises a cage.

5. The teat cup assembly of claim 1, further comprising air filtering material within said lower chamber.

6. The teat cup assembly of claim 1, wherein said seal separating said upper and lower chambers comprises a thickened section in said liner with a resilient rib which firmly abuts said shell.

7. The teat cup assembly of claim 1, wherein said upper and lower chambers are annular.

8. In a double-action teat cup assembly having a rigid shell sealed to a flexible liner forming an annular inflation chamber therebetween, an improved air inlet, comprising:
means sealing the outer surface of the liner to the inner surface of the shell to define a chamber therebetween beneath the annular inflation chamber;
at least one air inlet through the shell wall to said chamber; and
at least one air inlet through the liner wall from said chamber to the interior of the liner.

9. The improved air inlet of claim 8, further comprising:
air filtering material;
means for securing said filtering material around said inlets in said shell.

10. The improved air inlet of claim 9, wherein said means for securing said filtering material comprises a cage.

11. The improved air inlet of claim 8, further comprising air filtering material located in said chamber.

12. The improved air inlet of claim 8, wherein said means forming the seal separating said chamber from the annular inflation chamber comprises a thickened section in said liner with a resilient rib which firmly abuts said shell.

13. The improved air inlet of claim 8, wherein said chamber is annular.

14. A flexible liner for use with a rigid shell in a double-action teat cup assembly, said shell having an air inlet hole therein, comprising:
a tubular flexible liner for receiving a cow teat in its upper end;
means at said upper end of said liner forming a first annular seal between the liner and said shell;
means at the lower end of said liner forming a second annular seal between the liner and said shell;
means in said liner forming a third annular seal between said first and second annular seals thereby defining two adjacent annular chambers, said air inlet hole admitting air to the one of said chambers adjacent the bottom of said shell; and
at least one air inlet through said liner between said means forming said second and third annular seals.

15. The flexible liner of claim 14, wherein said means forming said third annular seal comprises a thickened section in said liner with a resilient rib which firmly abuts the shell.

* * * * *